United States Patent
Li et al.

(10) Patent No.: US 12,112,147 B2
(45) Date of Patent: Oct. 8, 2024

(54) MACHINE LEARNING APPLICATION DEPLOYMENT USING USER-DEFINED PIPELINE

(71) Applicant: NVIDIA Corporation, Santa Clara, CA (US)

(72) Inventors: Chunlin Li, Fremont, CA (US); Prashant Gaikwad, Cupertino, CA (US); Kaustabh Purandare, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 190 days.

(21) Appl. No.: 17/806,055

(22) Filed: Jun. 8, 2022

(65) Prior Publication Data

US 2022/0391175 A1    Dec. 8, 2022

Related U.S. Application Data

(60) Provisional application No. 63/208,483, filed on Jun. 8, 2021, provisional application No. 63/208,934, filed on Jun. 9, 2021.

(51) Int. Cl.
*G06F 8/34* (2018.01)
*G06F 8/36* (2018.01)
(Continued)

(52) U.S. Cl.
CPC .................. *G06F 8/34* (2013.01); *G06F 8/36* (2013.01); *G06F 8/60* (2013.01); *G06F 9/4486* (2018.02);
(Continued)

(58) Field of Classification Search
CPC ...... G06F 9/4486; G06F 9/542; G06F 16/906; G06F 8/34; G06Q 10/06
See application file for complete search history.

(56) References Cited

U.S. PATENT DOCUMENTS 11,238,048 B1 *  2/2022  Breeden ................ G06F 16/906
11,403,074 B1 *  8/2022  Gandhi ................... G06F 9/542
(Continued)

OTHER PUBLICATIONS

Guo et al, CN 106681727, (translation) May 17, 2017, 8 pgs <CN_106681727.pdf>.*
(Continued)

*Primary Examiner* — Tuan A Vu
(74) *Attorney, Agent, or Firm* — Maschoff Brennan

(57) ABSTRACT

Systems and methods are disclosed that relate to graphically representing different components (e.g., software modules, libraries, interfaces, or other blocks of code) that may be included in an application, linking the components in an ordered sequence to embody the application, and deploying the application to perform a task. The components may be displayed and represented as graphical components in a graphical application editor, or any other development environment. The graphical application editor may perform various operations with respect to the graphical components and the components respectively represented by and corresponding therewith. The operations may include facilitation of linking implemented instances of the graphical component objects together and/or developing the application by linking the underlying code associated with the graphical component objects according to the linking of the graphical component objects.

20 Claims, 10 Drawing Sheets

(51) Int. Cl.
   *G06F 8/60*    (2018.01)
   *G06F 9/448*   (2018.01)
   *G06F 9/54*    (2006.01)
   *G06F 16/906*  (2019.01)
   *G06N 20/00*   (2019.01)
   *G06Q 10/06*   (2023.01)
(52) U.S. Cl.
   CPC ............ *G06F 9/542* (2013.01); *G06F 16/906* (2019.01); *G06N 20/00* (2019.01); *G06Q 10/06* (2013.01)

(56) References Cited

U.S. PATENT DOCUMENTS

| | | | |
|---|---|---|---|
| 2003/0066051 A1* | 4/2003 | Karr | G06F 9/4486 712/E9.083 |
| 2008/0059944 A1 | 3/2008 | Patterson et al. | |
| 2010/0180220 A1 | 7/2010 | Becerra, Jr. | |
| 2011/0047516 A1* | 2/2011 | Pavan | G06Q 10/06 715/853 |
| 2017/0178020 A1 | 6/2017 | Duggan et al. | |

OTHER PUBLICATIONS

JP 6563381, (translation) Aug. 21, 2019, 18 pgs <JP_6563381.pdf>.*

International Search Report and Written Opinion issued in corresponding application No. PCT/US2022/032737, dated Dec. 13, 2022.

* cited by examiner

US 12,112,147 B2

MACHINE LEARNING APPLICATION DEPLOYMENT USING USER-DEFINED PIPELINE

RELATED APPLICATIONS

This application claims priority to U.S. Provisional Patent Application No. 63/208,483, filed Jun. 8, 2021, and titled "DEPLOYING A STREAMING/COMPUTING SYSTEM USING INTUITIVE GRAPHIC ELEMENTS," and to U.S. Provisional Patent Application No. 63/208,934, filed Jun. 9, 2021, and titled "SYSTEM FOR END-TO-END MODEL AND CONFIGURATION TRANSFER FROM TRAINING TO DEPLOYMENT," the entire contents of which are incorporated by reference in the present disclosure.

BACKGROUND

Developing applications to perform processing tasks often includes piecing together different blocks of code. Some code may be difficult to understand such that combining or re-arranging different code blocks in sub-optimal or incompatible ways may further complicate the development of the application. Additionally, using some code blocks in an application may include locating and linking parameters associated with the corresponding code blocks, which may be difficult to locate, link, or otherwise implement, particularly for users without extensive training or experience.

SUMMARY

Embodiments of the present disclosure relate to applications and platforms for configuring machine learning models for training and deployment using graphical components in a development environment. Systems and methods are disclosed that relate to graphically representing different components (e.g., software modules, libraries, interfaces, or other blocks of code) that may be included in the application, linking the components in an ordered sequence to embody the application, and deploying the application to perform a task. The components may be displayed and represented as graphical components in a graphical application editor, or any other development environment. The (e.g.,) graphical application editor may perform various operations with respect to the graphical components and the components respectively represented by and corresponding therewith. The operations may include facilitation of linking implemented instances of the graphical component objects together and/or developing the application by linking the underlying code associated with the graphical component objects according to the linking of the graphical component objects.

BRIEF DESCRIPTION OF THE DRAWINGS

The present systems and methods for training and deploying machine learning models using graphical components are described in detail below with reference to the attached drawing figures, wherein.

DETAILED DESCRIPTION

Figure 1:
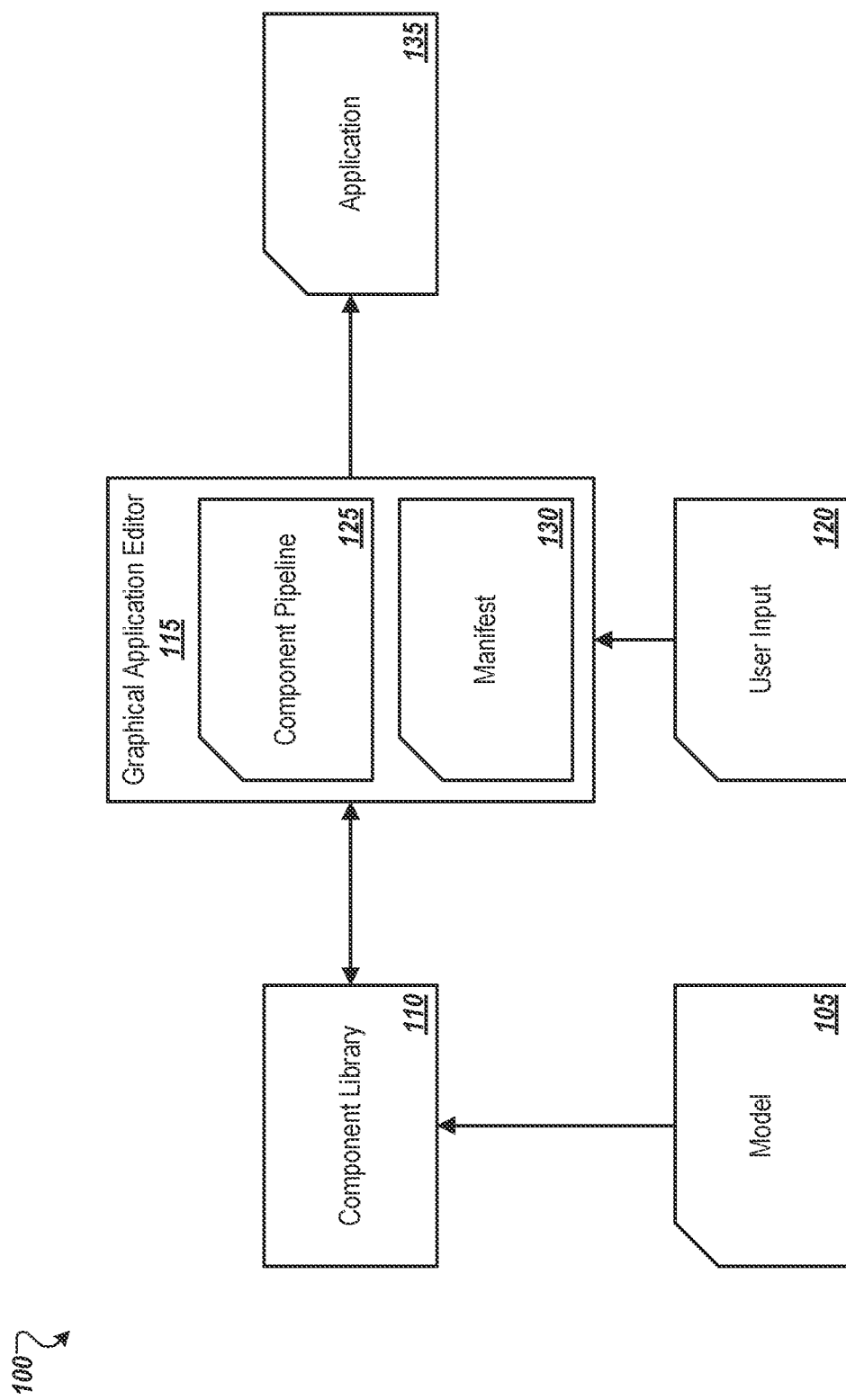
FIG. 1 illustrates an example system configured to arrange graphical components in a user interface to create an application, according to one or more embodiments of the present disclosure.

An application (e.g., a software or firmware application) as executed by or as part of one or more computing devices, may be assembled to accomplish one or more electronic tasks (which may be referred to as "tasks" in the present disclosure). Tasks may include, but not be limited to, image processing, video rendering, encoding and decoding functions, data parsing, speech recognition, natural language processing, and the like. An application may be configured to receive any number of inputs, may include one or more components (e.g., blocks of code) configured to perform tasks, such as any of the tasks described above, and may be configured to produce any number of outputs, which outputs may include results generated by the components performing the tasks.

For example, a computing device including an application configured to perform speech recognition may obtain an audio input including speech, may perform one or more tasks to recognize the speech, which may include, among others, a parsing component, a speech model component, and a speech comparison component, and the application may generate an output from the tasks performed by the components. For instance, based on the tasks performed by the components, the application may interpret the audio input and perform one or more operations according to the meaning of the audio input. In these and other embodiments, an application may be generated or modified by an application editor where a user may develop components, link components, and/or designate inputs and outputs associated with the application that may be used to perform tasks as determined by the user. In many instances, the components may be implemented in an application editor which may include a general-purpose programming language or a domain-specific programming language, both of which may include text-based language or lines of code. In these or other embodiments, the application editor may be configured to access and/or may include a component library of previously developed components, which may be used in the generating or editing of an application.

In some circumstances, some tasks performed by an application may include complex operations, which may include multiple components linked together to perform the task, such as speech recognition as described herein. Each component may include hundreds, thousands, or more lines of code such that the tasks performed by the components and/or the relationship between the components may become obfuscated in the text of the code. Some application editors may include a graphical interface where components may be represented by a graphical object. In the present disclosure, application editors that include such a graphical interface may be referred to as "graphical application editors".

Combining components to perform a task may include linking graphical component objects in a graphical application editor such that an application may be generated by the graphical application editor by arranging the corresponding components and their respective underlying code based on the arrangement of the graphical component objects. The linked graphical component objects may be illustrative of the linking between components (e.g., the inputs and outputs of the corresponding components) as a component pipeline. The component pipeline may accordingly be configured to perform such tasks. The graphical component objects may be a visual representation of the components that may be used to generate the application. In the present disclosure, reference to a graphical component object performing an operation or task may be referring to the component represented by the graphical component object performing such an operation.

Some components that may be visually represented in the graphical application editor may be configured as a machine learning model, or simply "model" in the present disclosure, unless otherwise defined. A model may include a file or structure (such as a data structure) that has been trained to recognize a pattern when presented with data. For example, a car identification model may be presented with multiple images of cars, including different makes and models, such that the car identification model may be trained to identify cars in future presented images. The model may include one or more algorithms that may be developed based on a training set of data, which may include known examples of data that the model may be configured to recognize. For example, the car identification model may include one or more algorithms to identify overall object shape, windshield, wheels and rims, license plates, steering wheels, and the like, each which may contribute to the car identification model being trained to identify a car.

In some circumstances, a model may use model files, model configuration parameters, pre-processing parameters, post-processing parameters, and/or user configurable parameters, referred to collectively as model assets, in order to perform recognition tasks for which the model may have been trained. In some circumstances, updates to the model (e.g., improvements to the model algorithms) may result in changes to one or more of the model assets such that the updated model may include one or more differences from the original model, which may be considered a new version of the model. In some circumstances, a user seeking to implement the model for use in an application may want to use a specific version of the model, which may entail verifying each of the model assets that are associated with the version sought to be implemented. In the event one or more of the elements of the model assets are mismatched with each other or with the desired model version, the model may fail to execute, as the model may lack the configuration parameters to initiate the model. Alternatively, or additionally, the results from the model (that includes mismatched model assets) may be erroneous or unexpected. For example, in instances in which a user wants to use a second version of a model but mistakenly obtains a model configuration parameter from the first version of the model, results generated by an application implementing the model may produce incorrect or unexpected results. In many circumstances, a user of the model may be responsible to identify the location and path to each of the model assets, which may be time consuming, tedious, and prone to version mismatches.

Some development of a model may follow a standard, which standard may designate the model assets that may be included in a model extension library associated with the model. For example, a user may train a model using a set of data and model assets. Upon completion of training the model, a model extension library may be generated, in which the extension library may include the model assets (e.g., the model files, the model configuration parameters, the pre-processing parameters, the post-processing parameters, and/or the user configurable parameters associated with the user trained model). Further, the model extension library may include a name and a version number, which may identify the model and associated version number of the model. In some circumstances, the model extension library may include the model assets included therein. Alternatively, the model extension library may include references to the model assets instead of the model assets themselves, such that the model extension library file size may be smaller but may be able to obtain the model assets in instances in which a user may deploy the model in an application. In these or other embodiments, the model extension library may be included in the component library used by the graphical application editor, such that future users of the model may be able to select the model from the component library and obtain the associated model assets which may be included in the model extension library.

Prior to the model extension library being added to the component library, the component library may verify that the model extension library includes an associated version number and the model assets associated with the model. For example, in instances in which the model extension library did not include one or more model assets, the component library may provide an indication to the user that the model extension library may be incomplete. In these or other embodiments, the component library may include, as available components, a listing of available models, including the model extension libraries and version numbers associated with the available models.

Returning to the graphical application editor, the component library may be displayed in the graphical application editor such that a user may be able to select one or more graphical component objects from the component library and include the selected graphical component objects in a canvas portion of the graphical application editor. Upon adding two or more graphical component objects to the canvas portion, a user may configure to link the graphical component objects, such as via a handle associated with each of the graphical component objects. A user may add additional graphical component objects and continue to link the graphical component objects via the associated handles to generate a graphical component pipeline. The graphical component pipeline may include a visualization of components (e.g., as a graph of nodes) that may be arranged to accomplish one or more tasks, for example, once the components represented by the graphical component objects are combined in an application and executed.

Some graphical component objects of the component library used by a graphical application editor may be incompatible with other graphical component objects in the graphical application editor. For example, in some circumstances, the incompatibility may arise when a first graphical component object includes a first interface (e.g., such as a first defined standard) and a second graphical component object includes a second interface (e.g., such as a second defined standard). For example, in instances in which a first graphical component object is representative of a video decoder that uses advanced video coding (or H.264), a second graphical component object may be representative of a video renderer which may also use advanced video coding, such that the first graphical component object and the second graphical component object may be compatible. In the event the video renderer used a different standard, such as versatile video coding (or H.266), the video decoder component and the video renderer component may be incompatible. In instances in which two components implement different standards, data generated and output by the first component may not be received as input by the second component as the interfaces may be incompatible. In practice, when attempting to connect incompatible handles of different graphical components, an indication may be provided (e.g., visually, audibly, etc.) to the user to indicate the incompatibility. For example, a connection may not be allowed for incompatible components, or a connection may be highlighted in a certain color or indicated with a symbol (e.g., an "x") indicating that the connection is in error. In some embodiments, when two graphical components (or their underlying tasks, processes, or operations) are incompatible, one or more other graphical components may be placed in between the incompatible graphical components (e.g., in the canvas) in order to convert or update a data format and/or data characteristic to allow for compatibility, as described in more detail herein.

In some embodiments, each graphical component object in the graphical application editor may include one or more handles associated therewith. In some embodiments, the graphical application editor may be configured to illustrate links between graphical component objects by linking handles between the graphical component objects such that the handles are illustrated as potential connection points between graphical component objects. In these or other embodiments, a graphical component object may be able to be linked with another graphical component object via any of the multiple handles. The handles may accordingly be used to generate a graphical component pipeline of multiple graphical component objects in which the graphical component objects of the graphical component pipeline are linked together via the handles. The graphical component pipelines may indicate a logical order of components (and their associated operations) that may be executed to perform a task. The application may include one or more component pipelines that may be used to perform one or more corresponding tasks.

In some embodiments, the respective handles may include a corresponding handle type that may correspond to a data format and/or a data characteristic associated with the graphical component object with which the handle is associated. In these or other embodiments, the handle type may be depicted in the graphical application and may provide an indication as to a data format and/or a data characteristic that may be compatible with the corresponding handle.

In some embodiments, the graphical application editor may be configured to provide an indication to the user of the graphical application editor that the handle and the handle type of the respective graphical component object may or may not be compatible with the handle and the handle type of another graphical component object. For example, the graphical application editor may provide a visual indicator that the handle of a first graphical component object is not compatible with the handle of a second graphical component object. In some embodiments, in instances in which the user of the graphical application editor adds a first graphical component object and a second graphical component object that include incompatible handle types, the graphical application editor may provide one or more recommendations to the user to link the first graphical component object and the second graphical component object. For example, the graphical application editor may suggest adding a new handle to the first graphical component object or adding a graphical connecting component object between the first graphical component object and the second graphical component object, as described herein.

In instances in which a handle of a first graphical component object is incompatible with a handle of a second graphical component object, a handle depiction with respect to the first graphical component object may be updated. The updating of the handle depiction may include depicting one or more new first component handles with the first graphical component object in which the one or more new first component handles have a handle type that is different from the incompatible handle type and that is compatible with the handle type of the second graphical component object. In these or other embodiments, updating the handle depiction may include adding a graphical connecting component object that may be disposed between the first graphical component object and the second graphical component object. In these or other embodiments, the respective handles of the first graphical component object and the second graphical component object may be linked to the graphical connecting component object such that the handle of the first graphical component object indirectly links to the handle of the second graphical component object via the graphical connecting component object, where the handle type of the first graphical component object may be compatible with a first handle type of the graphical connecting component object and a second handle type of the graphical connecting component object may be compatible with the handle type of the second graphical component object. In some circumstances, the graphical connecting component object may be removed from view in the graphical application editor such that the display illustrates the first graphical component object linked to the second graphical component object. The graphical connecting component object may be viewable by switching a view of the graphical application editor to see all of the graphical component objects and links in the application shown in the graphical application editor.

In the present disclosure, a first handle of a first graphical component object may be incompatible with a second handle of a second graphical component object when the data format and/or the data characteristic associated with the first handle (e.g., the first handle type) is not the same as or not a subset of the data format and/or the data characteristic associated with the second handle (e.g., the second handle type). In general, in instances in which an output generated by the first graphical component object and associated with a first handle includes a format that is unusable by the second graphical component object, the handle of the first graphical component object and the handle of the second graphical component object may be considered incompatible. For example, a first graphical component object may include a video source with a handle associated with video data on multiple channels and a second graphical component object may include a video renderer with a handle associated with video data on a single channel. The handle of the video source may be incompatible with the handle of the video renderer as the handle of the video source is configured to output multiple channels of video while the handle of the video renderer is configured to receive a single channel of video. In the alternative, a first handle of a first graphical component object may be compatible with a second handle of a second graphical component object when the first handle type is the same as or includes a subset of the second handle type. For example, a first component may include an audio source with a handle associated with audio data on a single channel and a second component may include an audio decoder with a handle associated with audio data on multiple channels. The handle of the audio source may be compatible with the handle of the audio renderer as the handle of the audio source is configured to output a single channel of audio and the handle of the audio renderer is configured to receive multiple channels of audio, which includes a single channel.

In these and other embodiments, a user may arrange the graphical component objects in the graphical application editor, including linking the graphical component objects using associated handles, as described herein. Following the arrangement of the graphical component objects, the graphical application editor may be configured to generate an application using the components represented by the arrangement of the graphical component objects in the graphical application editor. For example, in instances in which an output from a first graphical component object is linked to a second graphical component object via associated handles, the application may include the underlying code of the first component and of the second component in the application and may link an output from a first component to a second component using the data format and/or the data characteristic defined by the handles, such that a component pipeline may be included in an application.

After a user has arranged and linked the graphical component objects in the canvas portion of the graphical application editor, the graphical application editor may be configured to generate an application based on the arrangement of the graphical component objects. Generating the application may include the graphical application editor determining the extension library associated with each graphical component object included in the canvas portion of the graphical application editor, where the extension library for each graphical component object may be based on a version number determined by the user (e.g., such as when the user added the graphical component object to the canvas portion, the user may selected one version of the graphical component object over another). The extension library for each graphical component object may be obtained from the component library. Based on the determined extension libraries associated with the graphical component objects, the graphical application editor may generate a manifest of the extension libraries. The manifest may include the names of each extension library associated with each graphical component object in the canvas portion and the path to each extension library within the component library. In some circumstances, a composer tool may be used in conjunction with the graphical application editor which composer tool may be configured to determine the extension libraries to obtain and generate an associated manifest based on the extension libraries. For example, a tool like Graph Composer Registry may be used in conjunction with the graphical application editor.

The graphical application editor (or associated composer tool) may communicate the manifest to an execution tool, which execution tool may use the manifest to execute the application based on the arrangement of graphical component objects in the graphical application editor. Generating the application, such as by the graphical application editor or the associated execution tool, may include obtaining the components associated with the graphical component objects included in the component pipeline. The obtained components may be linked together based on the arrangement (e.g., the links) of the graphical component objects in the component pipeline.

The execution tool may follow one or more paths included in the manifest to obtain the extension libraries associated with each component that included a graphical component object in the component pipeline. For example, in instances in which a first graphical component object and a second graphical component object are linked in an application graph, an execution tool may obtain a first component, a second component, and the associated first extension library and second extension library, respectively, which extension libraries may be located based on the paths included in the manifest.

With the components, the links between the component, and the extension libraries obtained, the execution tool may generate an application that may be configured to perform one or more tasks, as arranged in the component pipeline. In some circumstances, the execution tool may include a graph composer engine, such as Graph eXecution Engine (GXE).

Other examples of systems that may implement or use applications that may be generated according to one or more operations of the present disclosure may include automotive systems (e.g., a control system for an autonomous or semi-autonomous machine, a perception system for an autonomous or semi-autonomous machine), systems for performing simulation operations, systems for performing deep learning operations, systems for performing synthetic data generation operations, systems for generating multi-dimensional assets using a collaborative content platform, systems implemented using an edge device, systems implemented using a robot, systems incorporating one or more virtual machines (VMs), systems implemented at least partially in a data center, systems implemented at least partially using cloud computing resources, systems for performing conversational AI operations, systems for performing light transport simulation, aerial systems, medical systems, boating systems, smart area monitoring systems, and/or other types of systems.

Further, the systems and methods described herein may be used to generate applications, train and/or deploy models, and for other purposes with respect to, and without limitation, machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be used to generate applications and/or to train and deploy models that may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Referring now to the figures, FIG. 1 illustrates an example system 100 configured to arrange graphical components in a user interface to create an application 135, according to one or more embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 may include a model 105, a component library 110, and a graphical application editor 115 configured to create the application 135. In some embodiments, the system 100 may be configured for end-to-end application development, arrangement, and deployment (as described herein below) which may simplify the experience for the user by removing the user from maintaining and/or tracking the paths and locations of parameters associated with components in the system 100.

In some embodiments, the model 105 may include a file or structure which may be configured to perform an electronic task (which may be referred to as a "task" in the present disclosure). A task may include, but not be limited to, image processing, video rendering, encoding and decoding functions, data parsing, speech recognition, natural language processing, and the like. For example, a task may include determining when instances or patterns the model 105 is trained on may be present in another set of data presented to the model 105.

The component library 110 may include a repository of components that may be used to create the application 135. The components may include blocks of code configured to perform certain tasks. The components may be implemented in a general-purpose programming language or a domain-specific programming language. Alternatively, or additionally, the components in the component library 110 may include hundreds, thousands, or more lines of code which may contribute to the complexity of the components. In these or other embodiments, the components may include complete software applications or portions of software applications. Additionally, or alternatively, the components may include model components, such as a model 105 and/or an associated model extension library described in further detail below.

In these or other embodiments, the component library 110 may include computational components, communication components (e.g., transmit components, receive components, etc.), codec components (e.g., encoding components and decoding components), visualization components, and the like. A computational component may include any component configured to perform operations using provided data, such as an inference component as described herein. For example, an inference component may perform inferencing tasks on received data which includes one or more computational operations. A communication component may include any transmit or receive components, that may be configured to communicate data under a defined format, structure, protocol, and/or the like. For example, a remote direct memory access (RDMA) transmitter may transmit data to an RDMA receiver such that data from a first component may be transmitted to a second component via RDMA. Codec components may include components that may perform a conversion to data provided thereto. For example, in instances in which a first component generates raw video and a second component is configured to perform inferencing on a video stream, an encoding component may be disposed between the first component and the second component to encode the raw video into a video stream. A visualization component may perform tasks directed to providing a visual indication of the computations that may be performed by other components. For example, in instances in which a car may be identified by an inferencing component, a visualization component may draw a box around the car to indicate the car identified by the inferencing component. The foregoing component examples are provided as examples only, and components included in the component library 110 may include more and/or various components configured to perform other tasks.

In some embodiments, the component library 110 may provide access to previously developed components, including models, such that the components may be deployed without a user recreating and/or training the component prior to deployment.

In some embodiments, the component library 110 may include a cloud-based network storage that may be accessible to any user with a connection to the component library 110. Alternatively, or additionally, the component library 110 may be local to a computing device in which the user is using to develop the application. Alternatively, or additionally, the component library 110 may be included in a network storage device, which may provide access to more computing devices than the local device, but that may not be as widely available as the cloud-based network storage. In these or other embodiments, the component library 110 may be included as part of the graphical application editor 115.

The component library 110 may include a listing of the components included therein. In some embodiments, the component library 110 may be searchable and/or sortable based on the component name (e.g., a model name), the task performed by the component, the version number associated with the component, and the like. Alternatively, or additionally, for each component included in the component library 110, the component library 110 may include a component name, the associated component files (e.g., the model extension library including the model assets or the model extension library including references to the model assets, such as described in detail herein), and the component path. The component path may include the path to the component and/or the path to associated component files.

As indicated above, the model 105 may be an example of a component included in the component library 110. In some instances, the model 105 may include one or more algorithms which may contribute to the model 105 identifying an object the model 105 is trained to identify. In general, the model 105 may include a file or structure (e.g., a data structure) that may be trained by one or more data sets to recognize patterns or instances of the object the model 105 is trained to determine. For example, in some embodiments, the model 105 may include a machine learning model such as a neural network, a deep neural network, or the like. For example, the model 105 may include any type of machine learning model, such as neural networks (e.g., convolutional, perceptron, feed forward, multilayer perceptron, radial basis functional, long short-term memory, sequence to sequence, generative adversarial, etc.), machine learning models (e.g., binary classification, multiclass classification, regression, forecasting, clustering, dimension reduction, etc.) and/or the like.

In some embodiments, the model 105 may follow a model interface, which may provide a framework of elements to be included as part of the model 105. For example, in some embodiments, the model interface may include model files, model configuration data, pre-processing parameters, post-processing parameters, and/or user configurable parameters, all of which may be collectively referred to as model assets. Model configuration files may include one or more parameters that may be used in initializing and/or operating the model 105. For example, a model may use multiple parameters that may be used with the model files to initialize the model prior to performing an operation or task. Pre-processing parameters and post-processing parameters may include any operations or tasks that may be performed before or after the tasks performed by the model, respectively, which may include preparing data into a format expected by the model or by a subsequent component that receives output from the model. For example, a pre-processing parameter may be used to convert an image from a raw image file to a first image type, which may be expected as an input to the model. In another example, a post-processing parameter may be used to convert an output generated by the model into a different output type—e.g., to determine clusters of pixels corresponding to a particular object from a semantic segmentation output of the model 105. The post-processed output may then be used by a subsequent component for additional processing. User configurable parameters may include one or more parameters associated with any of the model assets that may be alterable by the user. In some embodiments, in instances in which the user configurable parameters are not changed by the user, the user configurable parameters may include a default value. For example, a video identifying model may include a default video quality of 1080p, but the user may adjust the quality to be higher or lower, such as 1440p or 720p. In these or other embodiments, the model assets may be used in conjunction with the model 105 to perform recognition tasks for which the model 105 may be trained.

In some embodiments, the model 105 and/or the model assets may include a name and/or a model version number, which may be used to identify the model 105, the tasks that may be performed by the model 105, and/or a specific iteration of the model 105. For example, in instances in which an update to the model 105 has been applied, such as to improve an algorithm associated with the model 105, the model version number may be updated to reflect a change to the model assets of the model 105.

In these or other embodiments, the model 105 and/or the model assets may be implemented in a general-purpose programming language or a domain-specific programming language, both of which may include a text-based language or lines of code. In some embodiments, the model 105 may be configured to perform complex tasks, including any of the example tasks described herein. In some embodiments, the model 105 and/or the model assets may include hundreds, thousands, or more lines of code which may contribute to a difficulty in understanding the model 105 and/or methods of implementing the model 105 with other components.

In some embodiments, the model assets may be packaged into a model extension library as part of the model 105. The model extension library may include the model name and version number associated with the model 105 and the model assets, such that the model 105 may be identified by the model extension library. In some embodiments, the model extension library may be saved and/or shared such that another user may use the model 105 by implementing the model extension library, which may contain the model assets associated with the model 105 to be employed.

In some embodiments, the model extension library may include the model assets themselves, such that all of the model assets of the model 105 may be available for deployment of the model 105. Alternatively, or additionally, the model extension library may include one or more references to the model assets instead of the model assets themselves, such that the file size of the model extension library may be smaller, and a user may still deploy the model 105, such as in an application. In instances in which the model extension library includes one or more references to the model assets, the model extension library and/or the model assets may be located in a similar data storage, such as both the model extension library and the model assets located in the component library 110.

In some embodiments, the component library 110 may be configured to verify the model extension library includes at least a name, a model version number, and/or model assets associated with the model 105. In instances in which a user attempts to load a model extension library into the component library 110 that is missing a model version number and/or one or more model assets, the component library 110 may be configured to provide an indication to the user that the model extension library may be incomplete. Additionally, or alternatively, the paths of the component library 110 may include one or more paths of the model extension libraries of corresponding models, which may include a path to each of the model assets included in the model extension library (e.g., such as when the model extension library includes references to the model assets).

The graphical application editor 115 may include code and routines configured to enable one or more computing devices to perform one or more operations. Additionally, or alternatively, the graphical application editor 115 may be implemented using hardware including one or more processors, graphical processing units (GPUs), data processing units (DPUs), microprocessors (e.g., to perform or control performance of one or more operations), field-programmable gate arrays (FPGA), and/or application-specific integrated circuits (ASICs). In some other instances, the graphical application editor 115 may be implemented using a combination of hardware and software. In the present disclosure, operations described as being performed by the graphical application editor 115 may include operations that the graphical application editor 115 may direct a corresponding system to perform.

In general, the graphical application editor 115 may be configured to generate a component pipeline 125 as discussed in further detail herein. Additionally, or alternatively, the graphical application editor 115 may be configured to create the application 135 based on the component pipeline 125, as also discussed in further detail herein.

In some embodiments, the graphical application editor 115 may be configured to access the component library 110 and the components included therein. In these or other embodiments, the graphical application editor 115 may be configured to represent one or more components that are in the component library 110 as graphical component objects.

For example, the graphical application editor 115 may include a graphical user interface (GUI) that may include a canvas portion. In some embodiments, respective graphical component objects that may represent one or more components of the component library 110 may be represented in the GUI.

The graphical component objects may respectively include a graphical object that may be manipulated (e.g., selected, moved, connected with other graphical component objects, etc.) by the user input 120 in the canvas portion such that the user input 120 may be used to help develop the component pipeline 125. In some embodiments, the component pipeline 125 may include one or more components arranged and/or linked with each other to complete one or more tasks. For example, a user may select a first graphical component object from the component library 110 and add the first graphical component object to the canvas portion of the graphical application editor 115. The user may add a second graphical component object from the component library 110 to the canvas portion and may link the first graphical component object to the second graphical component object, as described herein. In some embodiments, the graphical application editor 115 may be configured to deploy the component pipeline 125 such that a first component represented by the first graphical application object may be linked to a second component represented by the second graphical application object, as arranged in the component pipeline 125.

The canvas portion of the graphical application editor 115 may display and arrange the graphical component objects based on the user input 120 in conjunction with the user arranging the graphical component objects in the canvas portion to form the component pipeline 125. For example, a user via the user input 120 may select a component from the component library 110 to add the component to the component pipeline 125. The graphical application editor 115 may be configured to add a corresponding graphical component object to the canvas portion of the graphical application editor 115. The user may add additional graphical component objects to the canvas in a similar manner and may link two or more graphical component objects together in the canvas portion of the graphical application editor 115.

In some embodiments, the graphical application editor 115 may be configured to provide at least two different views for the user, which may include a first view (e.g., a compact view) or a second view (e.g., a debug view). Either of the compact view or the debug view may be selected as a default view, such that the graphical application editor 115 may default to the selected default view upon opening.

In some embodiments, the compact view may provide a streamlined view of the component pipeline 125 and the graphical component objects and associated links included therein. For example, in the compact view, the component pipeline 125 may include a first graphical component object linked to a second graphical component object via a first handle that indicates an output to a second handle that indicates an input. In these or other embodiments, the compact view may include a predefined structure defining the elements that may be displayed as the component pipeline 125 by the graphical application editor 115. The compact view may emphasize a display of data flow within the component pipeline 125 and may deemphasize the connections between graphical component objects and/or how the data flows between the graphical component objects in the component pipeline 125.

For example, in instances in which the compact view is selected, the graphical application editor 115 may illustrate the component pipeline 125 including a first graphical component object with an output connected to an input of a second graphical component object. Alternatively, in instances in the debug view is selected, the graphical application editor 115 may illustrate the component pipeline 125 of the previous example including the first graphical component object having one or more associated handles, a connecting graphical component object having one or more associated handles, and the second graphical component object, where each of the handles of the graphical component object may include a display of at least the data format and/or the data characteristic.

In some embodiments, the debug view may provide a more detailed view of the component pipeline 125 and the graphical component objects and associated links included therein. For example, in the debug view, the graphical application editor 115 may display all of the graphical component objects, any intervening graphical objects, any of the links between the graphical component objects, and details associated with the handles of the graphical component objects, including input/output status, data format, and/or data characteristic associated with each of the handles (e.g., the handle type, as further described herein).

In some embodiments, some user input 120 not directly associated with the view may cause the view provided by the graphical application editor 115 to change. For example, in instances in which a user provides input to add another depiction of a handle to a graphical component object, the view of the component pipeline 125 may change to the debug view, as the compact view may not include displaying more than one handle associated with each graphical component object. Alternatively, or additionally, including some components in the component pipeline 125 may cause the view to switch from the compact view to the debug view. For example, a user adding an intervening component to be disposed between a first graphical component object and a second graphical component object may cause the debug view to be displayed. In general, user input 120 that may not be directly associated with the current view provided by the graphical application editor 115 may cause the graphical application editor 115 to change views.

Figure 2:
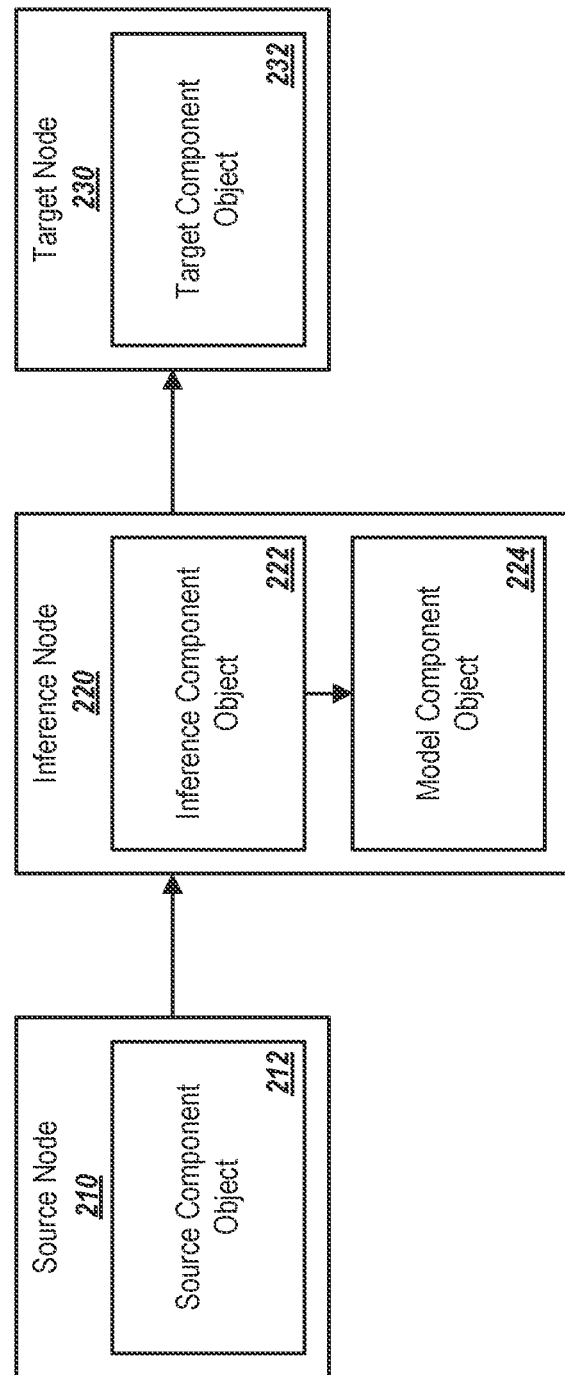
FIG. 2 illustrates an example component pipeline including multiple graphical component objects, according to one or more embodiments of the present disclosure.

In some embodiments, the user input 120 may select one or more components to be added to the component pipeline 125 and represented as graphical component objects. In some embodiments, the graphical component objects may be arranged and/or linked such that the corresponding components may be configured to perform a task. For example, as illustrated in FIG. 2, an example component pipeline 200 includes multiple graphical component objects including a source component object 212, an inference component object 222, a model component object 224, and a target component object 232. The component pipeline 200 may be the same or similar as the component pipeline 125 of FIG. 1. The source component object 212 may perform a source task (e.g., such as generating one or more source images), the inference component object 222 and the model component object 224 may perform an inference task (e.g., identify a portion of the image in accordance with the model), and the target component object 232 may perform a target task (e.g., include an indication of the identified portion and render the image).

In these or other embodiments, the graphical component objects included in the component pipeline 200 may be grouped together based on the task the graphical component objects are configured to perform. For example, the source component object 212 may be included in a source node 210 and may be configured to perform a source task; the inference component object 222 and the model component object 224 may be included in an inference node 220 and may be configured to perform an inference task; and the target component object 232 may be included in a target node 230 and may be configured to perform a target task. A source task may include any task of obtaining and/or preparing data to be used by subsequent components in the component pipeline 200. For example, a source task may include obtaining video frames from one or more camera devices. An inference task may include one or more processing tasks performed on at least the data received from a previous component or task. For example, an inference task may include identifying an object (e.g., a car) in video frames provided as input to the components in the inference node 220. A target task may include any post-inference task, which may include making changes to the output from the inference node 220, such as rendering, drawing, scaling, or other similar modifications to an output from the inference node 220. For example, a target task may include drawing a box around an object identified in the inference task and/or rendering the video including the identified object as obtained from the one or more components in the inference node 220.

In some embodiments, the number of graphical component objects that may be included in each node may be one or more. Alternatively, or additionally, the nodes may be included in the component pipeline 200 as a tool for the user to visually arrange the graphical component objects in the component pipeline 200. Further, additional nodes may be included, which may include one or more additional graphical component objects configured to perform additional tasks, such as another inference task based on the output from the target node 230. In general, the combination of the graphical component objects within the nodes illustrated in FIG. 2 may represent an example application configured to perform one or more tasks.

In instances in which an inference component object, such as the inference component object 222, is linked to a model component object, such as the model component object 224, the inference component object may be configured to call methods of and/or otherwise interact with the model component object, as part of the inference task. For example, the model component object may be developed in view of a standard interface (e.g., such as the model development method as described relative to FIG. 5), such that the inference component object may include a knowledge of the model assets that may be included with the model component object.

Figure 3:
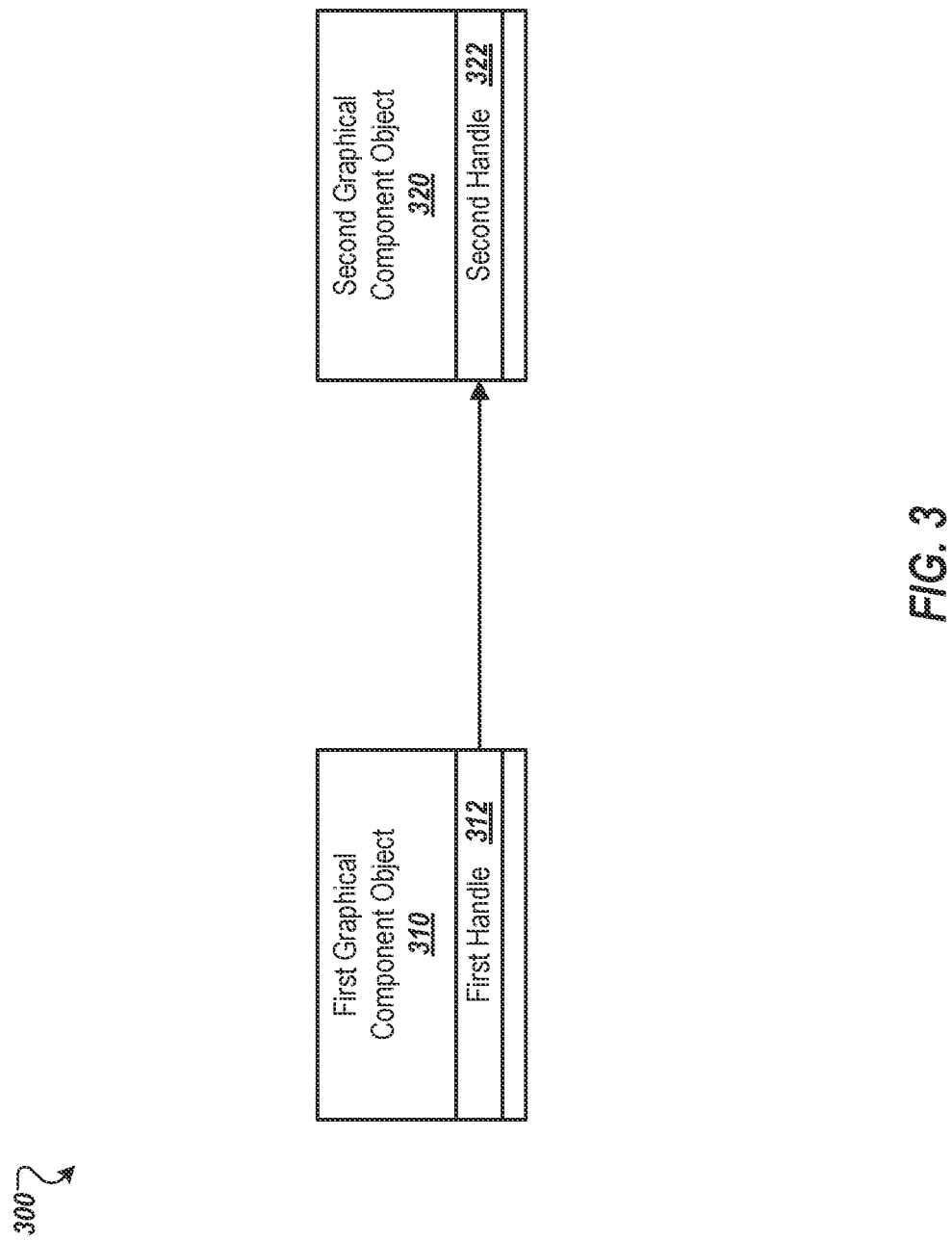
FIG. 3 illustrates another example component pipeline, according to one or more embodiments of the present disclosure.
Figure 4:
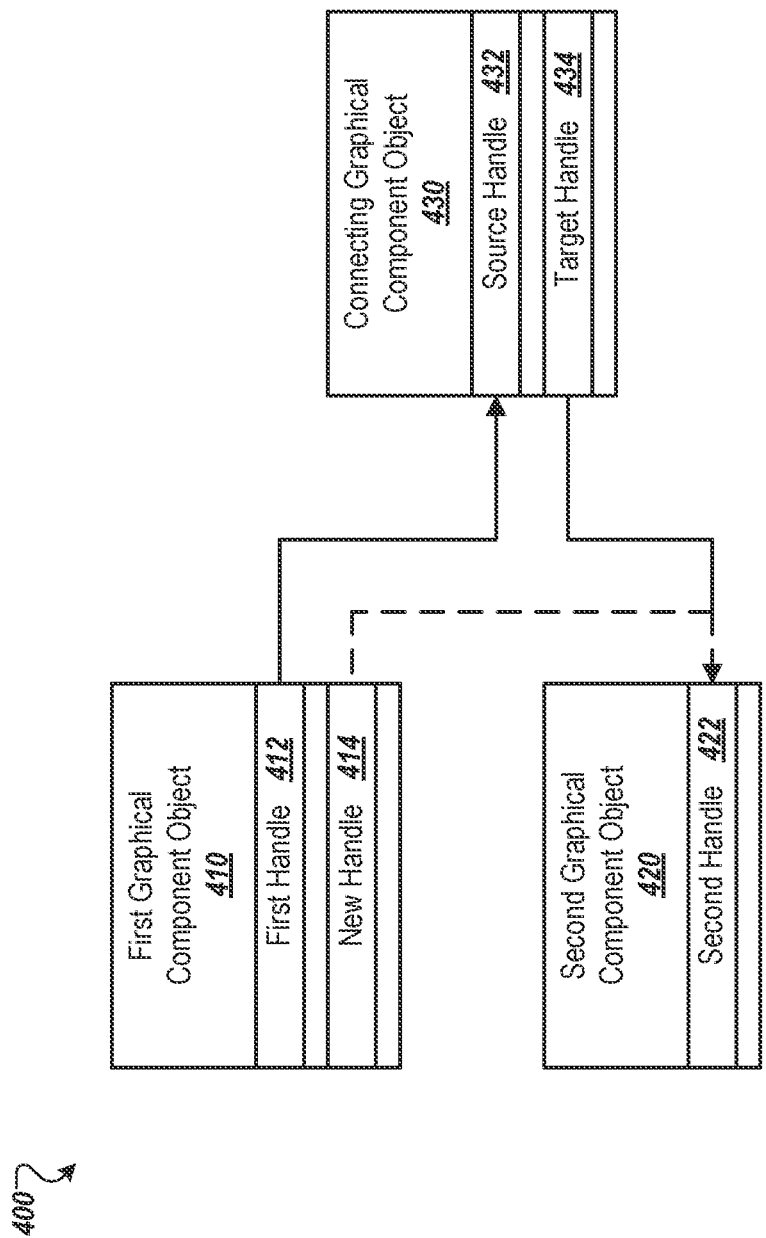
FIG. 4 illustrates another example component pipeline, according to one or more embodiments of the present disclosure.

Referring back to FIG. 1, in some embodiments, the graphical component objects may each include a handle that may be used for linking a graphical component object to another graphical component object in the component pipeline 125. Some graphical component objects may include a default handle, such that when the graphical component object is added to the component pipeline 125, the graphical component object may include an associated default handle. The handles associated with the graphical component objects may illustrate potential connection points between the graphical component objects, such that the graphical component objects may be linked together to form the component pipeline 125, as discussed below. In these or other embodiments, the user input 120 may draw a connection from a handle of a first graphical component object to a handle of a second graphical component object such that the first graphical component object may be linked with the second graphical component object in the component pipeline 125. FIG. 3 and FIG. 4 illustrate various components and associated handles, as discussed below.

In FIG. 3, an example component pipeline 300 may include a first graphical component object 310 and a second graphical component object 320. The component pipeline 300 may be the same or similar as the component pipeline 125 of FIG. 1. The first graphical component object 310 may include a first handle 312 and the second graphical component object 320 may include a second handle 322. In some embodiments, the first handle 312 may be a default handle associated with the first graphical component object 310 and the second handle 322 may be a default handle associated with the second graphical component object 320. For example, adding the first graphical component object 310 to the component pipeline 300 may include displaying the first handle 312 associated with the first graphical component object 310 and adding the second graphical component object 320 to the component pipeline 300 may include displaying the second handle 322 associated with the second graphical component object 320.

Alternatively, or additionally, the first handle 312 associated with the first graphical component object 310 may be added by the user via user input (e.g., such as the user input 120 of FIG. 1). For example, the user may determine to use a different handle than the default handle associated with the first graphical component object and the user may add the first handle 312 (e.g., which may differ from the default handle) to the first graphical component object 310. In these or other embodiments, the first graphical component object 310 may include more handles than the first handle 312 and/or the first graphical component object 310 may be configured to support more handles than those depicted in association with the first graphical component object 310. For example, the first graphical component object 310 may be configured to support a first handle, a second handle, and a third handle, where only the first handle 312 may be displayed with respect to the first graphical component object 310, and the second handle and the third handle may not be displayed.

In some embodiments, the first handle 312 and the second handle 322 may each include a corresponding handle type. The handle type may correspond to a data format and/or a data characteristic associated with the graphical component object with which the handle is associated. For example, the first handle 312 may include a first handle type (including a first data format and/or a first data characteristic) associated with the first graphical component object 310 and the second handle 322 may include a second handle type associated with the second graphical component object 320. In some embodiments, the handle type of the first handle 312 may be depicted in the component pipeline 300 including the first data format and/or the first data characteristic associated with the first graphical component object 310. Alternatively, or additionally, the handle type of the first handle 312 may be abstracted to display whether the first handle type is an input or an output. For example, the first handle 312 may be depicted as an output and the second handle 322 may be depicted as an input. In some embodiments, the depiction of the handle and/or the handle type may be associated with the view the user may have selected for the component pipeline 300. For example, as described herein, the compact view of the component pipeline 300 may display a streamlined view of the graphical component objects and/or the associated handles and linkages (which may include displaying an input or output status of the handle) and the debug view may display a complete view of the graphical component objects and/or the associated handles and linkages (which may include displaying the data format and/or data characteristic of the handle).

In some embodiments, the data format of the handle type may include a data structure or a data container in which data associated with the graphical component object may be presented. For example, the data format may include a video, an image, audio, numerical values, and the like, all of which may be associated with the graphical component object with which the handle is associated. In some embodiments, the data characteristic of the handle type may include variations in the arrangement of the data, such as a number of channels that may be included in the handle. For example, the data characteristic may include a single channel, multiple channels, static data, dynamic data, and the like, all of which may be associated with the graphical component object with which the handle is associated.

In instances in which a handle type associated with the first handle 312 of the first graphical component object 310 is compatible with a handle type associated with the second handle 322 of the second graphical component object 320, a user may link the first graphical component object 310 with the second graphical component object 320 by connecting the first handle 312 to the second handle 322 as part of the component pipeline 300. The user may link the first graphical component object 310 with the second graphical component object 320 in a graphical application editor, such as the graphical application editor 115 of FIG. 1. In some embodiments, the first handle 312 may be compatible with the second handle 322 when the first handle type is the same as or includes a subset of the second handle type. For example, the first graphical component object 310 may include an audio source with the first handle 312 associated with audio data on a single channel and the second graphical component object 320 may include an audio decoder with the second handle 322 associated with audio data on multiple channels. The first handle 312 may be compatible with the second handle 322 as the first handle 312 is configured to output a single channel of audio and the second handle 322 is configured to receive multiple channels of audio, where a single channel of audio is a subset of multiple channels of audio. Instances in which a first handle type may be incompatible with a second handle type is discussed herein at least with respect to FIG. 4.

In FIG. 4, an example component pipeline 400 may include a first graphical component object 410, a second graphical component object 420, and a connecting graphical component object 430. The component pipeline 400 may be the same or similar as the component pipeline 125 of FIG. 1. In FIG. 4, the first handle 412 of the first graphical component object 410 may include a first handle type that may be incompatible with a second handle type of the second handle 422 of the second graphical component object 420. In instances in which a handle type associated with the first graphical component object 410 is incompatible with a handle type associated with the second graphical component object 420, a graphical application editor associated with the component pipeline 400, such as the graphical application editor 115 of FIG. 1, may provide an indication to the user that the first handle 412 may not be linked with the second handle 422. For example, the incompatibility indication may include a text warning in the graphical application editor, or a visual warning in the graphical application editor (e.g., a different color associated with the first handle 412, the second handle 422, the first graphical component object 410, and/or the second graphical component object 420). Alternatively, or additionally, the graphical application editor may provide other indicators to the user that the first handle type and the second handle type may be incompatible, such as an audible tone, a pop-up window, and/or the like.

In some embodiments, a first handle type of the first handle 412 may be incompatible with a second handle type of the second handle 422 when the data format and/or the data characteristic associated with the first handle 412 (e.g., the first handle type) is not the same as or not a subset of the data format and/or the data characteristic associated with the second handle 422 (e.g., the second handle type). In general, in instances in which an output generated by a first component represented by the first graphical component object 410 and associated with the first handle 412 includes a format that is unusable by a second component represented by the second graphical component object 420, the first handle type of the first handle 412 and the second handle type of the second handle 422 may be considered incompatible.

In instances in which a user wants to connect the first graphical component object 410 to the second graphical component object 420, but a first handle type of the first handle 412 is incompatible with a second handle type of the second handle 422, the user may update a handle depiction such that the new handle 414 may be associated with the first graphical component object 410. In some embodiments, the new handle 414 may include a third handle type which may differ from the first handle type associated with the first handle 412 and the third handle type may be compatible with the second handle type of the second handle 422. In such instances, the first graphical component object 410 may be linked with the second graphical component object 420 by connecting the new handle 414 to the second handle 422 as the third handle type of the new handle 414 may be compatible with the second handle type of the second handle 422.

Alternatively, or additionally, the connecting graphical component object 430 may be included in the component pipeline 400 which may be used to indirectly link the first graphical component object 410 to the second graphical component object 420. The connecting graphical component object 430 may include a source handle 432 and a target handle 434 which may each include a corresponding handle type. In some embodiments, the handle type of the source handle 432 may be compatible with the first handle type of the first handle 412, and the handle type of the target handle 434 may be compatible with the second handle type of the second handle 422. In such instances, the first handle 412 may be linked with the source handle 432 and the target handle 434 may be linked with the second handle 422 such that the first graphical component object 410 may be linked with the second graphical component object 420 via the connecting graphical component object 430.

In some embodiments, additional connecting graphical component objects may be disposed between the first graphical component object 410 and the second graphical component object 420 which may contribute to linking the first graphical component object 410 to the second graphical component object 420. For example, one or more input and/or output buffers, data conditioners and/or transformative components, and/or the like may be disposed between the first graphical component object 410 and the second graphical component object 420 in the component pipeline 400. In some embodiments, the additional connecting graphical component objects may include transmitters and/ or receivers, which may be compatible with one another. For example, the first graphical component object 410 may be linked to a transmitter graphical component object and the second graphical component object 420 may be linked to a receiver graphical component object such that an output from the first graphical component object 410 may be input to the second graphical component object 420 via the transmitter graphical component object and the receiver graphical component object. In these or other embodiments, the additional connecting graphical component objects may be included in the component pipeline 400 to support the transfer of data from one component associated with a first graphical component object to another component associated with a second graphical component object. Some of the transport methods may include, but not be limited to, remote procedure calls (gRPC), Hypertext Transfer Protocol (HTTP), remote direct memory access (RDMA), transmission control protocol (TCP), user datagram protocol (UDP), and the like.

In some embodiments, the graphical application editor may display all of the graphical component objects and the associated handles and links between each in the component pipeline 400. For example, in the debug view of the component pipeline 400, the first graphical component object 410, the first handle 412, the second graphical component object 420, the second handle 422, the connecting graphical component object 430, the source handle 432, and/or the target handle 434 may each be displayed, along with the connecting lines between each. In instances in which the user switches the view of the component pipeline 400 from the debug view to the compact view, the component pipeline 400 may be simplified in the display while retaining the same graphical component objects and connections as the component pipeline 400 in the debug view. For example, in instances in which the component pipeline 400 is in the compact view, the component pipeline 400 may display the first graphical component object 410 linked with the second graphical component object 420 and not display the connecting graphical component object 430 or the associated source handle 432 and target handle 434.

Additionally, or alternatively, in some embodiments, the graphical application editor may be configured to provide recommendations in response to the user attempting to connect incompatible handle types. For instance, the graphical application editor may be configured to analyze different handle types that are associated with the graphical component objects that are being attempted to be linked to determine whether any of such handle types are compatible. In response to identifying compatible handle types, the graphical application editor may suggest using the identified handle types, and/or may automatically adjust the handle linking to include compatible handles. Additionally, or alternatively, the graphical application editor may be configured to similarly analyze whether any other components may have handle types that would allow a corresponding component to be used as a connecting component.

Referring back to FIG. 1, in some embodiments, two or more components linked together may form the component pipeline 125. In some embodiments, the arrangement of the components in the component pipeline 125 may be such that outputs from the tasks performed by the multiple components may be inputs to other components in the component pipeline 125. In these or other embodiments, the component pipeline 125 may include the graphical component objects in the graphical application editor 115, such that the component pipeline 125 may represent a component pipeline of the components that the graphical component objects represent.

For example, the component pipeline 125 of the graphical application editor 115 may include a first graphical component object linked to a second graphical component object, where the output from the first graphical component object may be input to the second graphical component object, forming the component pipeline 125. Upon deployment of the component pipeline 125, a first component may be linked to a second component such that an output from the first component may be input to the second component, as represented by the component pipeline 125.

In some embodiments, the component pipeline 125 may be deployed in response to an indication that the component pipeline 125 may be complete. In some embodiments, the graphical application editor 115 may include a composer tool that may be configured to deploy the component pipeline 125 upon completion. For example, a composer tool may include a tool like Graph Composer Registry, which may be used in conjunction with the graphical application editor 115. Deploying the component pipeline 125 may include the graphical application editor 115 preparing the component pipeline 125 to become an application (e.g., an application that may be executable, such as by software or another computing device or system). Deploying the component pipeline 125 may include the graphical application editor 115 determining the extension library (which may include a model extension library in instances in which the component is a model) associated with each graphical component object in the component pipeline 125 and the path associated with each of the determined extension libraries.

In some embodiments, the extension libraries and the associated paths may be included in the manifest 130. The manifest 130 may maintain a listing of the components, the associated extension libraries, the version number associated with the components, and/or the paths to the components and/or the associated extension libraries of the components, referred to collectively as the component elements, included in the component pipeline 125. In some embodiments, the component elements maintained in the manifest 130 may be with respect to the component library 110. For example, the component elements may be stored in the component library 110 and the path to each of the component elements may include a path for navigating the component library 110 to locate each of the component elements. In some embodiments, combinations of the component pipeline 125 and the manifest 130 may result in an application (e.g., the components, the links between said components, and the associated extension libraries), which upon executing, the application may accomplish one or more tasks as arranged by the component pipeline 125 in the graphical application editor 115.

In some embodiments, the graphical application editor 115 may be configured to execute the application once the component pipeline 125 may be complete and once the manifest 130 may be generated. Alternatively, or additionally, the graphical application editor 115 may include an execution tool that may be configured to execute the application upon completion. For example, an execution tool may include a graph composer engine like Gorilla eXecution Engine (GXE), which may be used in conjunction with the graphical application editor 115. Executing the component pipeline 125 may include instantiating and/or linking the components as represented by the graphical component objects in the component pipeline 125 of the graphical application editor 115 and may be accomplished by following the paths for each component and/or associated extension library maintained in the manifest 130. For example, in instances in which a first graphical component object is linked to a second graphical component object by a first handle, the graphical application editor 115 may instantiate the first component and the second component and may cause the first component to be linked to the second component as represented in the component pipeline 125. Further, the graphical application editor 115 may be configured to obtain and load the extension libraries associated with the components as defined by the manifest 130. For example, the graphical application editor 115 may obtain the extension library associated with each component in the component pipeline 125 by following the path defined in the manifest 130, for each extension library.

In some embodiments, loading the extension libraries may include preparing the underlying code associated with the extension libraries and/or the components for execution in an application. For example, loading the extension libraries may enable the one or more components to perform the tasks the one or more components are configured to perform, in response to executing the application.

Upon loading the components and the associated extension libraries, and linking the components as represented in the application graph, the application may be used to perform one or more tasks as designed in the component pipeline 125. The execution of the application may include executing the underlying code associated with the components and the associated extension libraries as represented by the graphical component objects in the component pipeline 125 of the graphical application editor 115.

Modifications, additions, or omissions may be made to the system 100 without departing from the scope of the present disclosure. For example, in some embodiments, the system 100 may include any number of other components that may not be explicitly illustrated or described.

Figure 5:
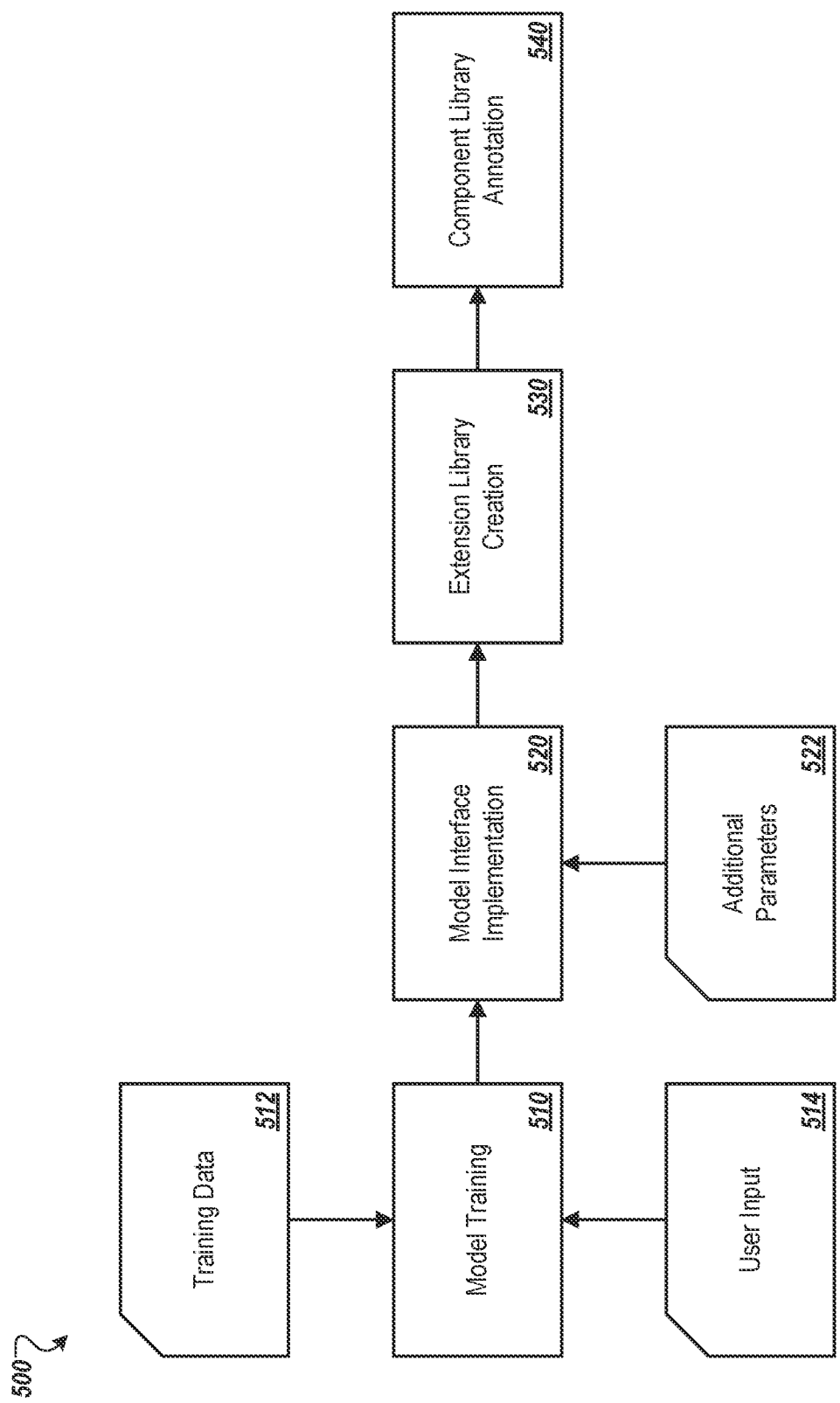
FIG. 5 illustrates an example process for developing a model for use as a component in a system, according to one or more embodiments of the present disclosure.

FIG. 5 illustrates an example process 500 for developing a model component for use as a component in a system, according to one or more embodiments of the present disclosure. The process 500 may include operations for developing a model that may be used in a system, such as the system 100 of FIG. 1. The operations of the process 500 may include model training 510, model interface implementation 520, extension library creation 530, and component library annotation 540.

In some embodiments, the model training 510 may include inputting training data 512 to the model, such that the model may develop one or more algorithms directed to identifying objects, patterns, and the like, in data. For example, in instances in which a model is being trained to identify a car in an image or video, the model may be presented with training data 512 that may include different makes and models of cars. The model may develop an algorithm to identify a car based on the training data 512 provided to the model.

In some instances, user input 514 may provide feedback to the model as part of the model training 510 that may correct or refine the algorithms used by the model to identify an object. For example, in instances in which the model identifies a motorcycle as a car, the user input 514 may direct the model to not include a motorcycle as a car, which may cause the model to update an algorithm to not include a motorcycle in a future car identification task. For example, one or more loss functions may be used to update one or more parameters (weights or biases) of the model 105 until the model 105 converges to an acceptable level of accuracy or precision.

In some embodiments, the model interface implementation 520 may include using a predefined structure for data and/or parameters associated with the model. In some embodiments, additional parameters 522 may be included with the model as part of the model interface implementation 520. The additional parameters 522 may contribute to the function of the model and/or the initialization and/or operation of the model once the model is in use. For example, the additional parameters 522 may include pre-processing parameters, post-processing parameters, model configuration parameters, and/or user configurable parameters, such as those described herein. In some embodiments, the model interface implementation 520 may include combining the additional parameters 522 with the model files from the model training 510, all of which may be referred to as the model assets.

The model assets may be used in conjunction with the model to perform recognition tasks for which the model may be trained. In some embodiments, the model and the model assets may include a name and/or a model version number, which may be used to identify the model, the tasks that may be performed by the model, and/or a specific iteration of the model. For example, in instances in which a user provides input to the model, such as to improve an algorithm associated with the model, the model version number may be updated to reflect a change to the model assets.

In some embodiments, the extension library creation 530 may include packaging the model and the model assets into an extension library or a model extension library. The model extension library may include the model name and version number associated with the model and the model assets, such that the model may be identifiable within the model extension library.

In some embodiments, the model extension library may include the model assets themselves, such that a user in possession of the model extension library and seeking to deploy the model, may have all of the model assets included in the model extension library. Alternatively, or additionally, the model extension library may include one or more references to the model assets instead of the model assets themselves, such that the file size of the model extension library may be smaller, and a user may still deploy the model, such as in an application. In instances in which the model extension library includes one or more references to the model assets, the model and/or the model assets may be located in a similar data storage device, such as both the model and the model assets located in the component library 110 of FIG. 1. Alternatively, or additionally, the model and one or more of the model assets may be located in different data storages devices and may each be referenced by the model extension library, such that the model extension library may be configured to obtain the model and the model assets across one or more data storage devices.

In some embodiments, the model extension library may be pushed to a component library as the component library annotation 540, such that the model and associated model assets may be used by other users with access to the component library. In some embodiments, implementing the model in an application may be simplified for future users as the model and the model extension library may contain all the parameters the model needs to function, including parameters used to initialize and operate the model. In some embodiments, the component library that the model and/or the model extension library may be pushed to may be the same or similar as the component library 110 of FIG. 1.

Modifications, additions, or omissions may be made to the process 500 without departing from the scope of the present disclosure. For example, in some embodiments, the process 500 may include any number of other actions or inputs that may not be explicitly illustrated or described.

Figure 6:
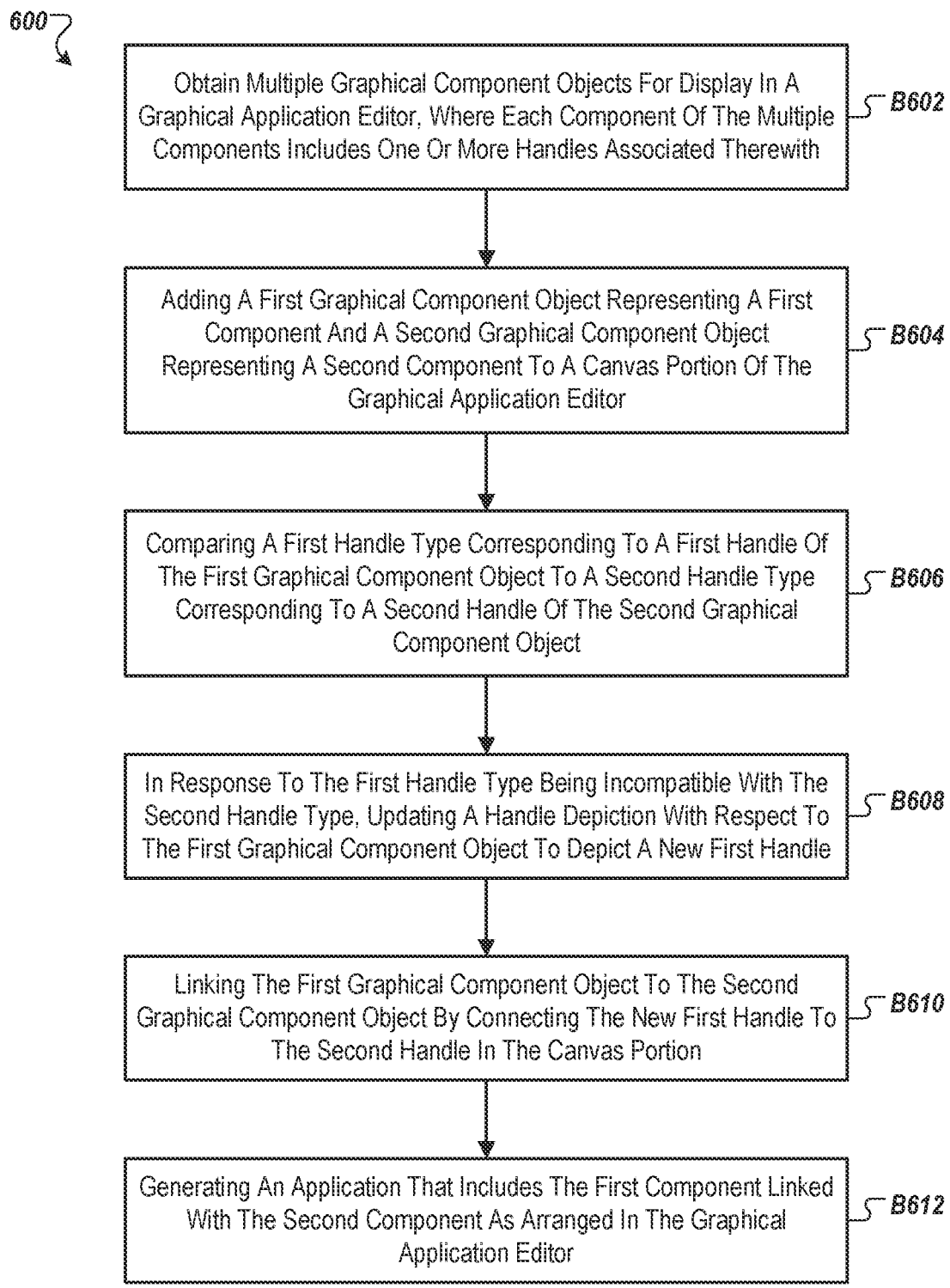
FIG. 6 illustrates an example method for displaying and linking graphical component objects in a user interface, according to one or more embodiments of the present disclosure.

FIG. 6 illustrates an example method 600 for displaying and linking graphical component objects in a user interface, according to one or more embodiments of the present disclosure. Each block of method 600, described herein, comprises a computing process that may be performed using any combination of hardware, firmware, and/or software. For instance, various functions may be carried out by a processor executing instructions stored in memory. The method 600 may also be embodied as computer-usable instructions stored on computer storage media. The method 600 may be provided by a standalone application, a service or hosted service (standalone or in combination with another hosted service), or a plug-in to another product, to name a few. In addition, the method 600 is described, by way of example, with respect to the system of FIG. 1. However, these methods may additionally or alternatively be executed by any one system, or any combination of systems, including, but not limited to, those described herein. In these or other embodiments, one or more operations of the method 600 may be performed by one or more computing devices, such as that described in further detail below with respect to FIG. 9.

The method 600 may include a block B602 where multiple graphical component objects may be obtained for display in a graphical application editor. The multiple graphical component objects may represent at least a functional block of code of multiple components, where each component of the multiple components may include one or more handles associated therewith. In some embodiments, the one or more handles may each represent a connection point of each component and the one or more handles each including a corresponding handle type. In some embodiments, each component of the multiple components may include one of a computational component, a transmitting component, or a receiving component.

At block B604, a first graphical component object representing a first component and a second graphical component object representing a second component of the multiple graphical component objects may be added to a canvas portion of the graphical application editor. In some embodiments, the first graphical component object and the second graphical component object may be added via user input. In some embodiments, the first graphical component object may display a first handle associated therewith and the second graphical component object may display a second handle associated therewith. In some embodiments, the first component may include a first default handle type that may correspond to a first default handle and the second component may include a second default handle type that may correspond to a second default handle.

At block B606, a first handle type corresponding to the first handle of the first graphical component object may be compared to a second handle type corresponding to the second handle of the second graphical component object.

At block B608, a handle depiction with respect to the first graphical component object may be updated in response to the first handle type being incompatible with the second handle type. In some embodiments, the updating of the handle depiction may include depicting a new first handle with the first graphical component object in which a third handle type of the new first handle may be compatible with the second handle type. In some embodiments, an indication may be provided to the user that the first handle type may be incompatible with the second handle type.

In some embodiments, the third handle type may be compatible with the second handle type based on the third handle type being the same as the second handle type. Alternatively, or additionally, the third handle type may be a subset of the second handle type.

At block B610, the first graphical component object may be linked to the second graphical component object by connecting the new first handle to the second handle in the canvas portion.

At block B612, an application that includes the first component linked with the second component may be generated as arranged in the graphical application editor represented by the new first handle of the first graphical component object linked to the second handle of the second graphical component object.

Modifications, additions, or omissions may be made to the method 600 without departing from the scope of the present disclosure. For example, in some embodiments, the method 600 may include the first component and the second component displayed in a first view of the graphical application editor. Alternatively, or additionally, the first component and the second component may be displayed in a second view of the graphical application editor, in response to a second user input. In some embodiments, the first handle of the first component may display an output handle type and the second handle of the second component may display an input handle type in the first view.

Although illustrated as discrete blocks, various blocks of the method 600 may be divided into additional blocks, combined into fewer blocks, or eliminated, depending on the desired implementation.

Figure 7:
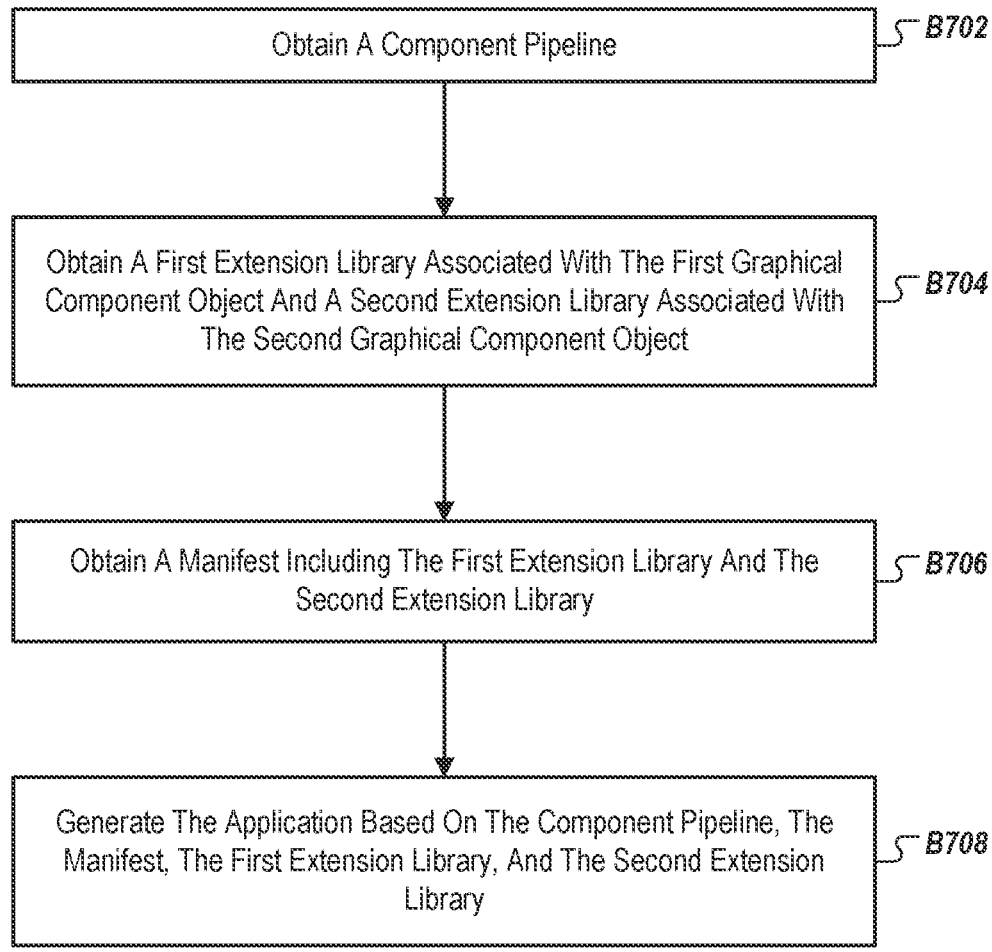
FIG. 7 illustrates an example method for displaying and linking graphical component objects in a user interface, and deploying the resultant application, according to one or more embodiments of the present disclosure.

FIG. 7 illustrates an example method 700 for displaying and linking graphical component objects in a user interface, according to one or more embodiments of the present disclosure. Each block of method 700, described herein, comprises a computing process that may be performed using any combination of hardware, firmware, and/or software. For instance, various functions may be carried out by a processor executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few. In addition, the method 700 is described, by way of example, with respect to the system of FIG. 1. However, these methods may additionally or alternatively be executed by any one system, or any combination of systems, including, but not limited to, those described herein. In these or other embodiments, one or more operations of the method 700 may be performed by one or more computing devices, such as that described in further detail below with respect to FIG. 9.

The method 700 may include a block B702 where a component pipeline may be obtained. In some embodiments, the component pipeline may include a user-defined component pipeline, such as described above, In these or other embodiments, obtaining of the component pipeline may include receiving the component pipeline or generating the component pipeline based on user input such as described above.

The component pipeline may include at least one of a first graphical component object and a second graphical component object that are linked together in the component pipeline. In some embodiments, the first graphical component object may represent a first component for inclusion in an application configured to execute one or more tasks, and the second graphical component object may represent a second component for inclusion in the application. In some embodiments, the first component may be an inference component, and the second component may be a model component.

In these or other embodiments, the linking of the first graphical component object to the second graphical component object may be based at least in part on a compatibility between a first handle associated the first graphical component object and a second handle associated with the second graphical component object, such as discussed above. Additionally or alternatively, the component pipeline may be generated such as described above in some embodiments.

At block B704, a first extension library associated with the first graphical component object and a second extension library associated with the second graphical component object may be obtained. In these or other embodiments, obtaining the first extension library and the second extension library may include generating the first extension library and the second extension library. Alternatively, or additionally, obtaining the first extension library and the second extension library may include determining the first extension library and the second extension library. Alternatively, or additionally, obtaining the first extension library and the second extension library may include receiving the first extension library and the second extension library from another system or device. In generally, an obtaining element in any of the blocks may include generating, determining, or receiving the associated element.

In some embodiments, the first extension library may include at least one of a configuration file, a pre-processing parameter, a post-processing parameter, or a user configurable parameter. Alternatively, or additionally, the first extension library may be associated with a first version number of the first graphical component object and the second extension library may be associated with a second version number of the second graphical component object.

At block B706, a manifest may be obtained. The manifest may include a listing of the first extension library and the second extension library. Alternatively, or additionally, the manifest may include a first path in the component library to the first extension library and a second path in the component library to the second extension library.

At block B708, the application may be generated based on based on the component pipeline, the manifest, the first extension library, and the second extension library. Generating the application may include obtaining an instance of the first component and an instance of the second component. Generating the application may also include automatically linking the first component to the second component according to the arrangement of the first graphical component object linked to the second graphical component object as represented in the component pipeline.

In these or other embodiments, generating the application may further include obtaining, based at least in part on the manifest, the first extension library associated with the first component. For example, obtaining the first extension library may include loading the first extension library associated with the first component by following the first path included in the manifest. Additionally or alternatively, generating the application may further include obtaining, based at least in part on the manifest, the second extension library associated with the second component, which may include in some embodiments. loading the second extension library associated with the second component by following the second path included in the manifest. The first extension library may include at least a configuration file of the first component and the second extension library may include at least a configuration file of the second component. In these or other embodiments, the application may include the underlying code of the first component, the second component, the first extension library, and the second extension library.

Modifications, additions, or omissions may be made to the method 700 without departing from the scope of the present disclosure. For example, in some embodiments, a third graphical component object and a fourth graphical component object may be added to the application graph, where the third graphical component object may be a source component, and the fourth graphical component object may be a target component. In some embodiments, the third graphical component object may be included in a first node, the first graphical component object and the second graphical component object may be included in a second node, and the fourth graphical component object may be included in a third node. In some embodiments, the first node may be configured to perform a first task, the second node may be configured to perform a second task, and the third node may be configured to perform a third task. Alternatively, or additionally, a first node output may be input to the second node, and a second node output may be input to the third node.

Although illustrated as discrete blocks, various blocks of the method 700 may be divided into additional blocks, combined into fewer blocks, or eliminated, depending on the desired implementation. Further, although a certain number of components and related objects are described herein, they are only given as examples and the operations described may be applicable with respect to any number of components and to many different component pipeline configurations, which may include any number of different components.

Figure 8:
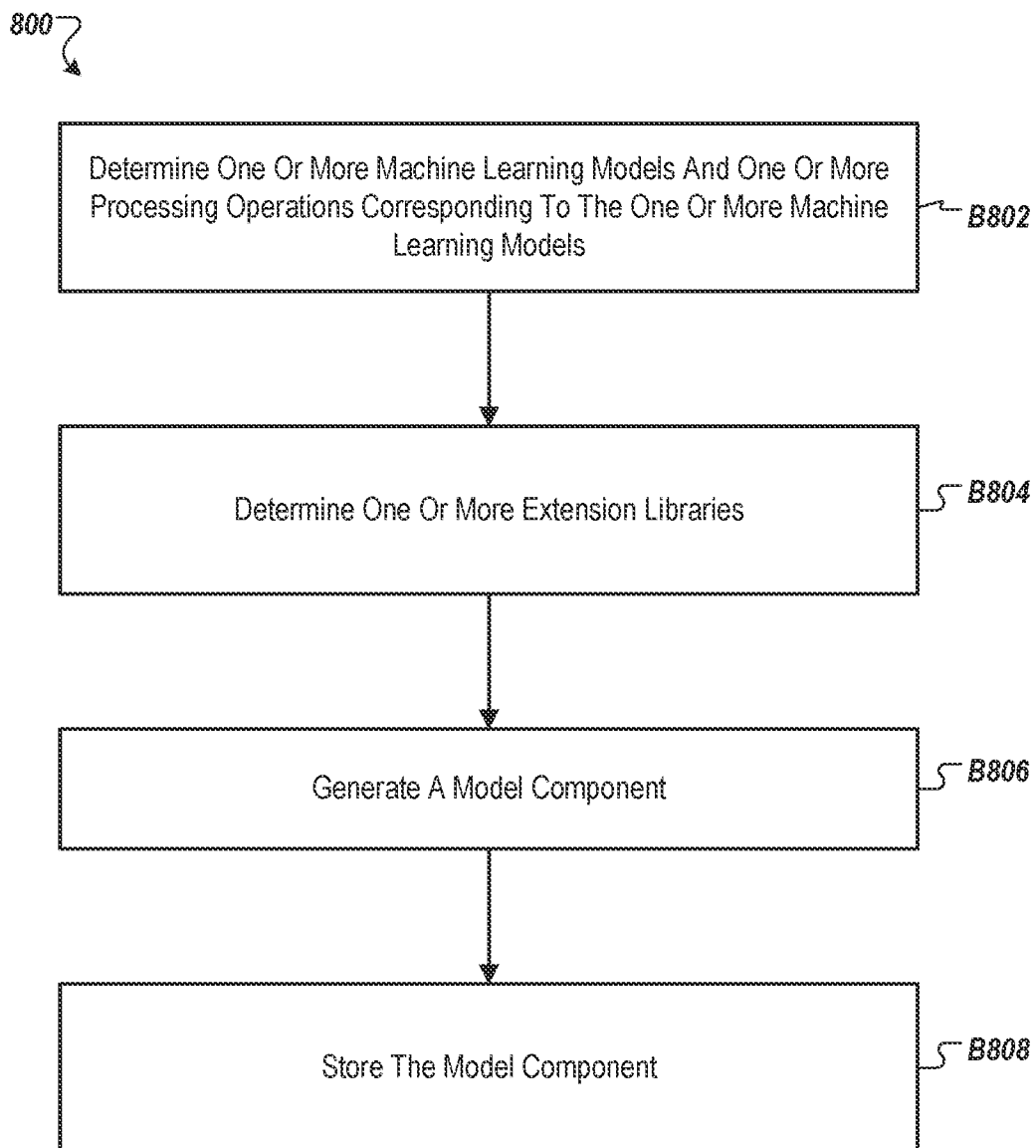
FIG. 8 illustrates an example method for developing a model component of a machine learning model, according to one or more embodiments of the present disclosure.

FIG. 8 illustrates an example method 800 for developing a model component of a machine learning model, according to one or more embodiments of the present disclosure. Each block of method 800, described herein, comprises a computing process that may be performed using any combination of hardware, firmware, and/or software. For instance, various functions may be carried out by a processor executing instructions stored in memory. The method 800 may also be embodied as computer-usable instructions stored on computer storage media. The method 800 may be provided by a standalone application, a service or hosted service (standalone or in combination with another hosted service), or a plug-in to another product, to name a few. Further, the method 800 may be executed by any one system, or any combination of systems, including, but not limited to, those described herein. In these or other embodiments, one or more operations of the method 800 may be performed by one or more computing devices, such as that described in further detail below with respect to FIG. 8.

The method 800 may include a block B802 where one or more machine learning models ("models") and one or more processing operations corresponding to the one or more machine learning models may be determined. The models described above may include examples of the models that may be selected. Further, the one or more processing operations may include operations such as pre-processing and/or post-processing operations that may correspond to pre-processing or post-processing parameters, such as discussed above. In these or other embodiments, the one or more processing operations may include one or more user-defined operations.

In some embodiments, the one or more models may be determined based on one or more inputs provided to a graphical user interface. For example, in some embodiments, the inputs may include selection of the one or more models. In these or other embodiments, the inputs may include linking the one or more machine learning models and the one or more processing operations according to a desired order of execution. For example, the inputs may include inputs used to generate a component pipeline such as the component pipelines described above having any one of at least one of the different components discussed above. In these or other embodiments, the inputs may include selection of one or more of the processing operations.

At block B804, one or more extension libraries may be determined. In these or other embodiments, the one or more extension libraries may respectively correspond to the one or more models and may be determined based on the corresponding models and processing operations. By way of example, the extension libraries may be determined such as described above. Further, in some embodiments, at least one extension library of the one or more extension libraries may include one or more programmed instructions to cause one or more processing units to perform the one or more processing operations.

At block B806, a model component may be generated. In some embodiments, the model component may be generated based on the one or more models, the one or more processing operations, and the one or more extension libraries. For example, in some embodiments, the model component may include a combination and/or representation of the one or more models, the one or more processing operations, and the one or more extension libraries.

At block B808, the model component may be stored in a component library. The storage may be such that, when the model component is selected for inclusion in a component pipeline corresponding to an application, a deployment of the application includes an implementation of the component pipeline comprising the one or more machine learning models and the one or more processing operations, such as described above.

Modifications, additions, or omissions may be made to the method 800 without departing from the scope of the present disclosure. For example, in some embodiments, the method 800 may be configured to deploy an instance of the application, such as described above. Further, although illustrated as discrete blocks, various blocks of the method 800 may be divided into additional blocks, combined into fewer blocks, or eliminated, depending on the desired implementation. Further, although a certain number of components and related objects are described herein, they are only given as examples and the operations described may be applicable with respect to any number of components and to many different component pipeline configurations, which may include any number of different components.

Example Computing Device

Figure 9:
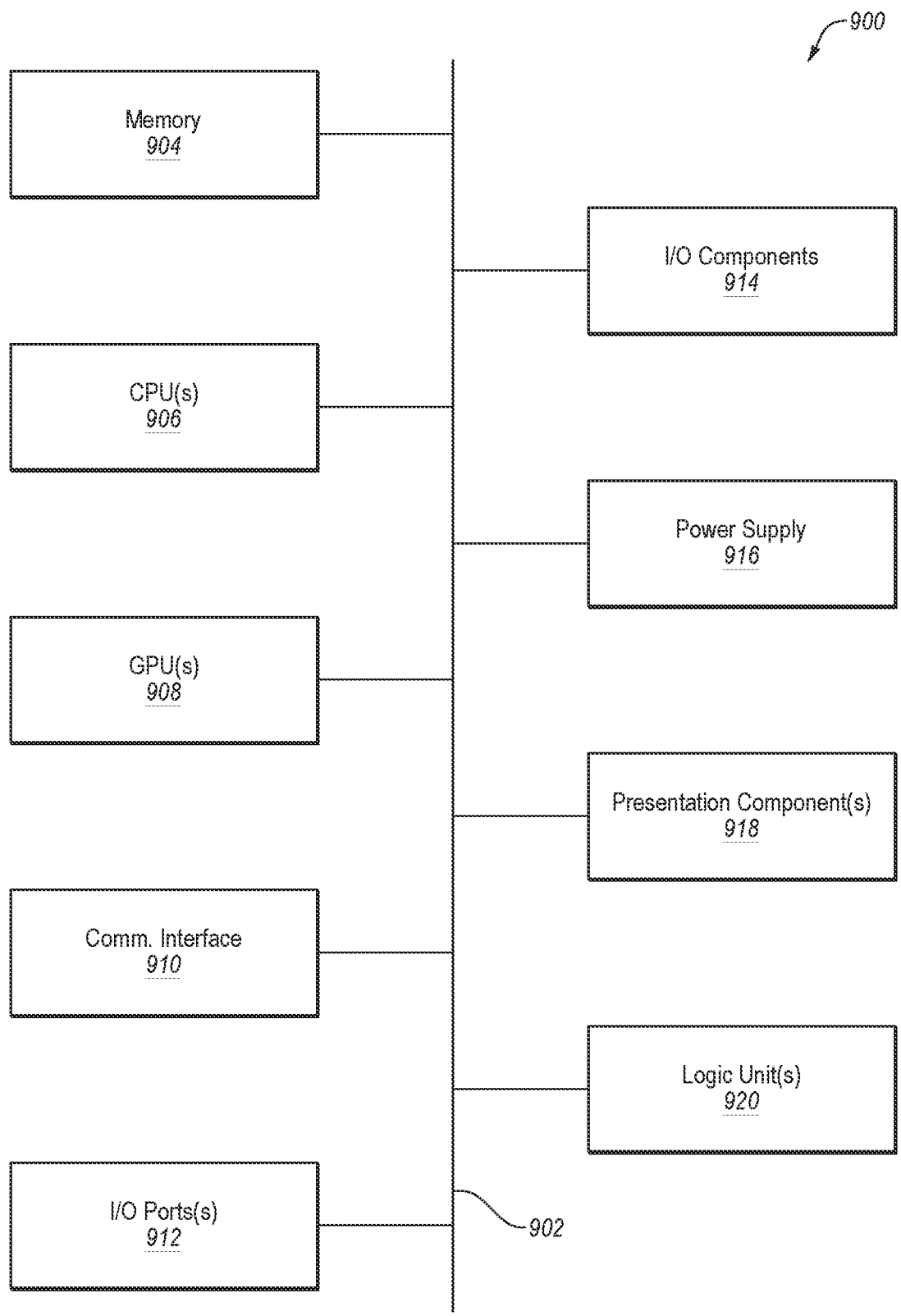
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, I/O ports 912, input/output components 914, a power supply 916, one or more presentation components 918 (e.g., display(s)), and one or more logic units 920.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point, connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, including wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built into (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

Example Data Center

Figure 10:
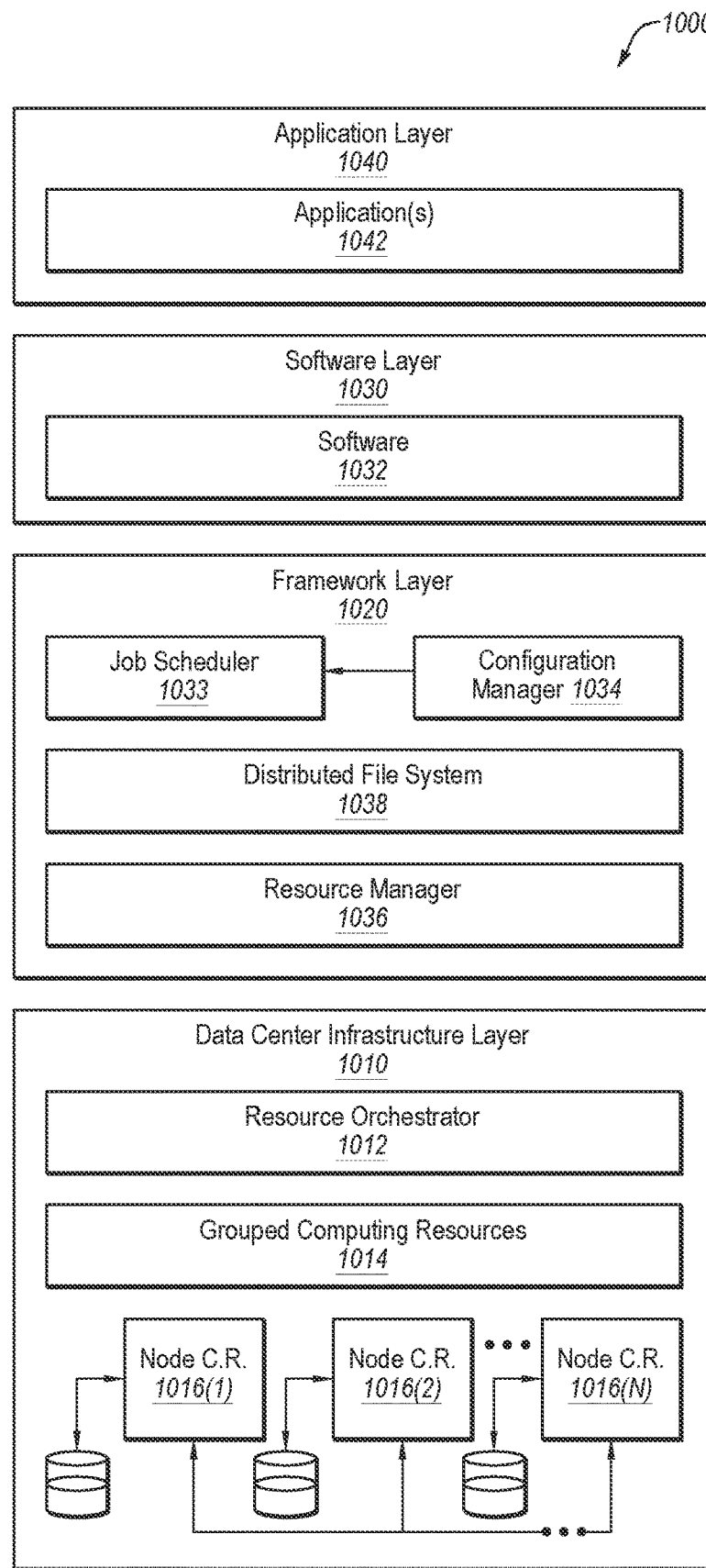
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1) 1016(N), where "N" represents any whole, positive integer. In at least one embodiment, node C.R.s 1016(1) 1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1) 1016(N) may correspond to a server having one or more of the above-mentioned computing resources. In addition, in some embodiments, the node C.R.s 1016(1) 1016(N) may include one or more virtual components, such as vGPUs, vCPUs, and/or the like, and/or one or more of the node C.R.s 1016(1) 1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1) 1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1033, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1033 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1033. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1) 1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1) 1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 9 900 of FIG. 9 9—e.g., each device may include similar components, features, and/or functionality of the computing device(s) 9 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 9 900 described herein with respect to FIG. 9 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Further, use of the term "based at least on" in the present disclosure or claims does not mean that omission of "at least" in other places term means "only". For example, use of the term "based on X" in the present disclosure or claims may also mean "based at least on X" even though the term "at least" is not used in the particular instance but is used elsewhere.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
receiving a user-defined component pipeline that includes at least one first graphical component object linked to at least one second graphical component object via handles of the at one first component object and the at least one second graphical component object, the at least one first graphical component object representing at least one first component for inclusion in an application and the at least one second graphical component object representing at least one second component for inclusion in the application, at least one handle of the handles including a visual depiction of a specific data type or data characteristic of its corresponding handle;
generating the application, at least in part, by:
according to the user-defined component pipeline, obtaining an instance of the at least one first component and an instance of the at least one second component and automatically linking the instance of the at least one first component to the instance of the at least one second component; and
obtaining, based at least in part on a manifest associated with the user-defined component pipeline, a first extension library associated with at least one first component and a second extension library associated with the at least one second component, the manifest including a first path to the first extension library and a second path to the second extension library.

2. The method of claim 1, wherein at least one of the first extension library or the second extension library include at least one of a configuration file, a pre-processing parameter, a post-processing parameter, or a user configurable parameter.

3. The method of claim 1, wherein the first extension library is associated with a first version number of the at least one first graphical component object and the second extension library is associated with a second version number of the at least one second graphical component object.

4. The method of claim 1, wherein the linking of the at least one first graphical component object to the at least one second graphical component object is based at least in part on a compatibility between a first handle associated with the at least one first graphical component object and a second handle associated with at least one second graphical component object.

5. The method of claim 4, wherein, when the first handle associated with the at least one first graphical component object and a second handle associated with the at least one second graphical component object are not compatible, an indication of the incompatibility is populated within a graphical user interface (GUI) of a component pipeline editor.

6. The method of claim 4, wherein, when the first handle associated with the at least one first graphical component object and a second handle associated with the at least one second graphical component object are compatible, a connection between the first handle and the second handle is graphically represented using a graphical user interface (GUI) of a component pipeline editor.

7. The method of claim 1, wherein the user-defined component pipeline is generated using a graphical user interface (GUI) of a component pipeline editor, and the component pipeline editor includes a first mode and a second mode, the second mode corresponding to a view of the user-defined component pipeline within the GUI having a greater amount of detail corresponding to at least one component of the user-defined component pipeline than the first mode.

8. The method of claim 1, wherein at least one of the first graphical component object or the second graphical component object is associated with a plurality of handles, each handle of the plurality of handles corresponding to a different data type or data characteristic.

9. A system comprising:
one or more processing units to:
add, based at least in part on one or more user inputs, a first graphical component object representing a first component and a second graphical component object representing a second component to a canvas portion of a graphical application editor, the first graphical component object displayed with a first handle and a third handle associated therewith and the second graphical component object displayed with a second handle associated therewith;
compare a first handle type corresponding to the first handle of the first graphical component object to a second handle type corresponding to the second handle of the second graphical component object;
compare a third handle type corresponding to the third handle of the first graphical component object to the second handle type corresponding to the second handle of the second graphical component object;
in response to the first handle type being compatible with the second handle type, display, using the canvas portion, an indication of a valid connection between the first handle and the second handle;
in response to the third handle type being incompatible with the second handle type, display, using the canvas portion, an indication of an invalid connection between the third handle and the second handle; and
generate an application that includes the first component linked with the second component based at least on the first handle being compatible with the second handle and the third handle being incompatible with the second handle.

10. The system of claim 9, wherein the first component includes a first default handle type corresponding to a first default handle and the second component includes a second default handle type corresponding to a second default handle.

11. The system of claim 9, further comprising:
display the first component and the second component using a first format in a first view of the graphical application editor; and
in response to receiving another one or more user inputs, display the first component and the second component using a second format in a second view of the graphical application editor.

12. The system of claim 11, wherein in the first view, the first handle of the first component displays an output handle type and the second handle of the second component displays an input handle type, and in the second view, the output handle type and the input handle type are not displayed.

13. The system of claim 9, wherein the one or more processing units are further to provide an indication to a user that a third handle type is incompatible with a fourth handle type based at least in part on the user attempting to link the third handle type to the fourth handle type.

14. The system of claim 9, wherein the first component and the second component correspond to at least one of a computational component, a transmitting component, or a receiving component.

15. A system comprising:
one or more processing units to:
- add, via user input, a first graphical component object representing a first component and a second graphical component object representing a second component of to a canvas portion of a graphical application editor, the first graphical component object displaying a first handle associated therewith and the second graphical component objects displaying a second handle associated therewith;
- determine a compatibility between the first handle and the second handle at least by comparing a first handle type corresponding to the first handle of the first graphical component object to a second handle type corresponding to the second handle of the second graphical component object;
- in response to the first handle type being incompatible with the second handle type, add a connecting component to the canvas portion of the graphical application editor, the connecting component being added to the canvas portion based at least on the connecting component including a first connecting handle having a third handle type and a second connecting handle having a fourth handle type, where the third handle type is compatible with the first handle type and the fourth handle type is compatible with the second handle type;
- link the first graphical component object to the second graphical component object via the connecting component; and
- generate an application that includes the first component linked with the second component via the connecting component according to an arrangement represented using the graphical application editor.

16. The system of claim 15, wherein the third handle type is compatible with the second handle type based at least on the third handle type being the same as the second handle type.

17. The system of claim 15, wherein the third handle type is a subset of the second handle type.

18. The system of claim 15, wherein the one or more processing units are further to provide an indication to a user that the first handle type is incompatible with the second handle type.

19. The system of claim 15, wherein the first component includes a first default handle type corresponding to a first default handle and the second component includes a second default handle type corresponding to a second default handle.

20. The system of claim 15, wherein the system comprises one or more of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

* * * * *